United States Patent
Kagei

(10) Patent No.: US 8,866,935 B2
(45) Date of Patent: Oct. 21, 2014

(54) DRIVE UNIT, CAMERA SYSTEM, AND NON-TRANSITORY MACHINE READABLE MEDIUM

(71) Applicant: Canon Kabushiki Kaisha, Tokyo (JP)

(72) Inventor: Kenji Kagei, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/772,199

(22) Filed: Feb. 20, 2013

(65) Prior Publication Data

US 2013/0222651 A1 Aug. 29, 2013

(30) Foreign Application Priority Data

Feb. 24, 2012 (JP) ................................. 2012-039021

(51) Int. Cl.
*H04N 5/262* (2006.01)
*H04N 5/232* (2006.01)

(52) U.S. Cl.
CPC ........... *H04N 5/262* (2013.01); *H04N 5/23296* (2013.01)
USPC .................................... 348/240.3; 348/208.3

(58) Field of Classification Search
None
See application file for complete search history.

(56) References Cited

U.S. PATENT DOCUMENTS 5,479,203 A * 12/1995 Kawai et al. ................. 348/14.1

FOREIGN PATENT DOCUMENTS

| EP | 1713260 A2 | 10/2006 |
| EP | 2288139 A1 | 2/2011 |
| JP | 3496944 B2 | 2/2004 |
| JP | 2007-282069 A | 10/2007 |

* cited by examiner

*Primary Examiner* — Roberto Velez
*Assistant Examiner* — Angel L Garces-Rivera
(74) *Attorney, Agent, or Firm* — Canon USA Inc. IP Division

(57) ABSTRACT

Provided is a drive unit which, if an amount of driving to rotate the imaging optical system during the preset mode is smaller than a threshold value in accordance with an imaging field angle of the imaging optical system, the control unit is further configured to control the driving to rotate at a speed in accordance with a change rate per unit time of imaging field angle and the imaging field angle by the zooming of the imaging optical system and, if the amount of driving to rotate the imaging optical system during the preset mode is greater than the threshold value, the control unit is further configured to control the driving to rotate at a speed irrespective of a change rate per unit time of the imaging field angle and the imaging field angle by the zooming of the imaging optical system.

11 Claims, 8 Drawing Sheets

DRIVE UNIT, CAMERA SYSTEM, AND NON-TRANSITORY MACHINE READABLE MEDIUM

BACKGROUND OF THE INVENTION

1. Field of the Invention

The present invention relates to a drive unit which drives, for example, an imaging optical system and a camera. More particularly, the present invention relates to a drive unit which has a preset function for moving, for example, an imaging optical system and a camera to a previously registered position, and relates to a camera system.

2. Description of the Related Art

Regarding a camera platform used in a monitoring camera system and a weather camera system, a preset function for moving a monitoring camera or a weather camera to a previously registered zoomed, focused, tilted or panning position has been proposed. Regarding such a preset function, a simultaneous start/stop function to start/end each operation substantially at the same time has been proposed. If an operation is performed at a certain constant speed, a change rate of an imaging range of an obtained image is constant during panning and tilting operations while a change rate of a field angle with respect to a moved amount varies depending on the position of a zoom lens during a zooming operation. For this reason, even in a preset operation to a certain subject which exists in a field angle, a viewer may have feeling of strangeness, like a subject once disappears from the field angle and then enters again in the field angle during the operation, in an obtained image when zooming, panning and tilting operations are performed at a constant speed.

As a method for preventing this phenomenon, Japanese Patent No. 3496944 discloses an exemplary operation unit for changing the moving speed in panning and tilting operations in accordance with a current field angle. Further, Japanese Patent Laid-Open No. 2007-282069 discloses an exemplary camera platform system which prevents generation of images which causes feeling of strangeness while reducing the amount of calculation by approximating speed curves in panning and tilting in accordance with the change rate of the field angle of zooming.

However, in both the unit disclosed in Japanese Patent No. 3496944 and the system disclosed in Japanese Patent Laid-Open No. 2007-282069, since the panning and tilting speed is changed in accordance with the change in the field angle caused by the zooming operation, the time in which the unit or the system are operated at the maximum speed (which is usually determined for each model) is short. Therefore, if the moved amount by the panning and tilting operations is large, time necessary for the panning and tilting operations becomes long as compared with a case in which the panning and tilting operations are performed at a constant speed. The time necessary for the preset operation then becomes long.

SUMMARY OF THE INVENTION

A drive unit which is capable of operating in a preset mode in which a zooming operation of an imaging optical system to a predetermined zoom position is performed and, at the same time, driving a rotation of the imaging optical system wherein said rotation includes at least one of panning and tilting of the imaging optical system to a predetermined rotational position, the drive unit including a control unit configured to perform the driving of the imaging optical system in the preset mode in accordance with designated predetermined rotational and zoom positions and with rotational and zoom positions of the imaging optical system at the start of the preset mode, wherein the control unit is further configured so that, in a case of operating in the preset mode, if the amount of driving to rotate the imaging optical system is smaller than a threshold value based on the imaging field angle of the imaging optical system, the control unit controls the driving to rotate the imaging optical system at a speed based on the change rate per unit time of the imaging field angle of the zoom of the imaging optical system and, if the amount of driving to rotate of the imaging optical system is greater than the threshold value, the control unit controls the driving to rotate the imaging optical system at a speed not based on the change rate per unit time of imaging field angle of the imaging optical system.

A drive unit of another aspect of the present invention is a drive unit which performs driving to rotate which includes at least one of panning and tilting of an imaging optical system which performs zooming, the drive unit including a control unit which is configured to transmit, to the imaging optical system, a zoom instruction in accordance with a zooming position stored in a memory which stores position information including a rotational position in driving to rotate at least one of panning and tilting and a zooming position and drives to rotate the imaging optical system in accordance with the rotational position stored in the memory, wherein: the control unit is configured so that it may drive the imaging optical system in a preset mode in which transmission of the zoom instruction and the driving to rotate are performed such that zooming of the imaging optical system in accordance with the zoom instruction and the driving to rotate the imaging optical system in accordance with the rotational position are performed at the same time; and in a case in which the preset mode is set, if an amount of driving to rotate the imaging optical system during the preset mode is smaller than a threshold value in accordance with an imaging field angle of the imaging optical system, the control unit is further configured to control the driving to rotate at a speed in accordance with a change rate per unit time of imaging field angle and the imaging field angle by the zooming of the imaging optical system and, if the amount of driving to rotate the imaging optical system during the preset mode is greater than the threshold value, the control unit is further configured to control the driving to rotate at a speed irrespective of a change rate per unit time of the imaging field angle and the imaging field angle by the zooming of the imaging optical system.

Further features of the present invention will become apparent from the following description of exemplary embodiments with reference to the attached drawings.

DESCRIPTION OF THE EMBODIMENTS

Figure 1:
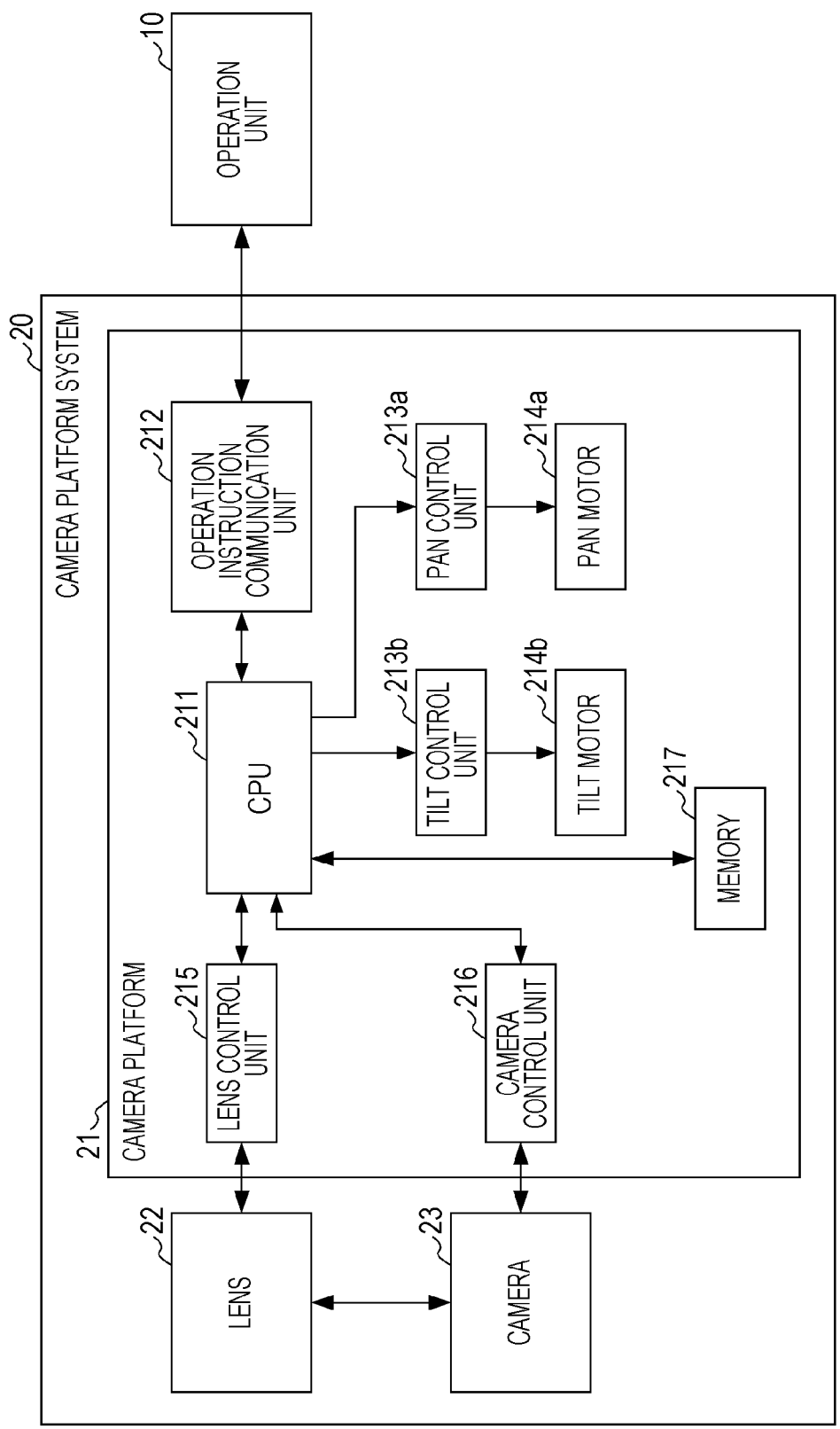
FIG. 1 is a block diagram of a first embodiment.

An object of the present invention is to provide a drive unit (i.e., a camera platform) and a camera driving system capable of reducing feeling of strangeness caused by a nonlinear movement of a subject during a preset operation and capable of completing the preset operation quickly.

Hereinafter, preferred embodiments of the present invention will be described in detail with reference to the accompanying drawings.

First, an outline of the present invention will be described. The present invention relates to a drive unit (i.e., a camera platform, a camera rotating device) capable of performing at least one of panning and tilting to an imaging optical system (or a camera which includes the imaging optical system) and, at the same time, operating in a preset mode in which a zooming operation of the imaging optical system is performed. The drive unit includes a support unit (i.e., a mount table) which supports the imaging optical system (or a camera in which an imaging optical system and a camera body portion including an image pickup element are integrated with each other) and drives the imaging optical system in rotational directions which includes two directions of panning and tilting directions. Rotation (i.e., driving to rotate) herein has the same meaning to change an imaging range in the left-right direction and in the up-down direction.

The drive unit of the present embodiment is capable of operating in an operation mode of the preset mode and, in the preset mode, the imaging optical system and the drive unit are driven toward a zooming position, a focusing position, a panning position and a tilting position which are stored in a storage unit, such as memory. That is, driving to zoom (i.e., movement of a zooming lens group) and focusing drive (i.e., movement of a focus lens unit) of the imaging optical system are performed at the same time with changing in a direction of the imaging optical system (i.e., an imaging range) (drive in a panning direction and drive in a tilting direction). Here, the drive unit includes the memory which stores a plurality of pieces of position information. The drive unit transmits a zooming instruction (i.e., a zooming position instruction or a zooming speed instruction) to the imaging optical system (or a camera) in accordance with the zooming position stored in the memory. The drive unit drives the imaging optical system to rotate in accordance with a rotational position of the imaging optical system (i.e., the position or angle in the panning direction and the position or angle in the tilting direction) which is also stored in the memory. Desirably, in an operation of a normal preset mode, the driving to zoom of the imaging optical system and the driving to rotate the imaging optical system are started at the same time and ended at the same time. However, slight time lag at the start and the end may exist. For example, it is only necessary that the time lag at the start and the end is less than 10% with respect to the time of the entire preset operation (i.e., the set time or actual time). The problem of the present invention is caused if the driving to zoom is performed at the same time even in a short time with at least one of the driving in the panning direction and the driving in the tilting direction. Therefore, even if the time in which driving is performed at the same time is short (desirably, equal to or longer than 50% of a preset operation time), an effect is produced by application of the present invention.

That is, when the driving in the panning direction and the driving in the tilting direction are performed at the same time with the driving to zoom in, for example, the present mode, moving speed in the imaging range by the driving in the panning direction and the driving in the tilting direction is constant while the speed of change in the imaging field angle by the driving to zoom is not constant. The change in the imaging field angle by the driving to zoom (i.e., the amount of change per unit time in the imaging field angle or the amount of change per unit movement in the imaging field angle amount of a zooming lens group which moves during the driving to zoom) is usually larger in the vicinity of a wide angle end and is smaller in the vicinity of a telephoto end. If a difference between the change rate per unit time of the imaging field angle by this driving to zoom (i.e., the amount of change) and the change rate per unit time of the imaging range by the driving to rotate in the panning direction and in the tilting direction is large, a phenomenon of nonlinear movement of the subject during the preset mode occurs. The nonlinear movement of the subject which may occur in the preset mode include, for example, a movement of the subject which once moves out of the imaging range (i.e., disappears from the imaging range) and then re-enters the imaging range, or moves in a rounded manner in the imaging range. Especially, if the subject which is a main subject performs the above-described movement after the preset operation is ended, the viewer of the image may have strong feel of strangeness.

The "change rate per unit time of imaging field angle" is the ratio of change per unit time in the imaging field angle (i.e., per unit movement of the movement performed when the driving to zoom of the imaging optical system is performed). That is, the image is originally captured in a range of 100 m wide and 75 m long (i.e., by the imaging field angle) and, if the imaging range is changed into 67.5 m wide by 90 m long, the change rate becomes 10%. That is, the change rate is the ratio of the amount of change with respect to the imaging field angle (in accordance with the zooming position) before the change takes place. The change rate per unit time of the imaging field angle is used here in consideration of the zooming speed. For example, if it is possible to control the zooming speed to be always constant, the control unit may control the imaging optical system not by the change rate per unit time but by the change rate per unit movement of the imaging field angle of the movement performed at the driving to zoom.

Such a problem described above is known to be caused significantly when the moved amount in the panning direction and the moved amount in the tilting direction in the preset mode (i.e., during the preset operation) are equal to or smaller than a predetermined value. In particular, such a problem may be caused significantly when the moved amount in the panning direction during the preset operation is equal to or smaller than a threshold value which is determined by the imaging field angle of the current panning direction (i.e., the transverse direction) and when the moved amount in the tilting direction during the preset operation is equal to or smaller than a threshold value which is determined by the imaging field angle of the current tilting direction (i.e., the vertical direction). The threshold value determined by the imaging field angle is the amount of driving to rotate in the panning direction and in the tilting direction with respect to θall (desirably θall/2) when the entire field angle in the panning direction and in the tilting direction of the imaging optical system is represented by θall. If the moved amount during the preset operation is equal to or smaller than the amount of driving to rotate, an unnatural movement of the subject in the imaging range during the preset operation occurs in accordance with the difference between the field angle change rate by zooming and the change rate of the imaging range by panning and tilting.

If the moved amount in the panning and in the tilting during the preset operation (i.e., the amount of driving to rotate necessary to pan and tilt) is greater than the threshold value which is determined by the imaging field angle, the problem is not important for the viewer of the captured image. Therefore, in this case, it is not necessary to consider the driving in the panning direction and in the tilting direction to be special driving.

Then, in the present invention, in a case in which the moved amount during the preset operation is smaller than (or equal to or smaller than) the above-described threshold value, the driving to rotate the imaging optical system is controlled at a speed in accordance with the change rate per unit time of the imaging field angle by zooming of the imaging optical system and the imaging field angle. That is, the problem described above is solved by controlling the speed of the driving to rotate the imaging optical system in the panning direction and in the tilting direction in accordance with the (change in the) change rate of the imaging field angle by the zooming during the preset mode (i.e., the zooming position change). In the control of the speed of driving to rotate, the speed of driving to rotate (in the panning direction and in the tilting direction) is reduced when the change rate per unit time of the imaging field angle by the zooming is small (i.e., the first state) and is increased when the above-described change rate is large (i.e., the second state). That is, in the present embodiment, the rotational speed in driving to pan and in the driving to tilt are controlled (i.e., changed) in accordance with (so as to correspond to) the field angle change by the zooming. Thus, the difference described above is reduced and feel of strangeness in the movement of the subject in the imaging range during the preset operation is eliminated. Since the first state and the second state are determined by their relative relationships, both the first state and the second state always exist in a single preset operation.

The speed of driving to rotate may also be referred to as a change rate of an imaging range by driving to rotate. That is, the speed of driving to rotate may be controlled such that, a change rate per unit time of an imaging range by the driving to rotate in a first state in which the change rate per unit time of the imaging field angle is low is smaller than a change rate per unit time of an imaging range by the driving to rotate in a second state in which the change rate per unit time of the imaging field angle is larger than in the first state. The change rate of the imaging range is dependent also on the imaging field angle which changes momentarily in accordance with the change in the field angle by the zooming. In particular, the "change rate per unit time of the imaging range" is a ratio at which the imaging range by the imaging optical system is changed per unit time (i.e., per unit movement of the movement performed when driving to rotate the imaging optical system in the panning direction and in the tilting direction is performed). That is, if the imaging optical system is driven in the panning direction (i.e., the transverse direction) with the imaging range which is originally 100 m wide and 75 m long being moved to the right by 10 m in the imaging range (and is not driven in the tilting direction, i.e., in the vertical direction), the change rate per unit time of this imaging range is 10%. It is obvious that this change rate depends on the imaging range (i.e., the imaging field angle, the zooming position) at that time and on the speed of driving to rotate in the panning direction and in the tilting direction. The change rate per unit time of the imaging range is used here in consideration of the rotational speed in the panning direction and in the tilting direction. For example, if it is possible to control the rotational speed in the panning direction and in the tilting direction to be constant, the control unit may control the imaging optical system not by the change rate per unit time but by the change rate per unit movement of the imaging range of the movement performed at the time of driving to rotate the imaging optical system in the panning direction and in the tilting direction.

Here, controlling (e.g., changing) the speed of driving to rotate the camera is to control the speed except for an acceleration state at the initial stage of the driving and a deceleration state at the end stage of the driving, i.e., normally, to control the speed of the camera in a state in which the camera is driven at a constant speed. Normally, it is desirable the constant speed corresponds to the maximum speed as the camera is moved to the target position quickly. However, the constant speed is not fixed at the maximum speed and the driving speed is reduced to either of the first state or the second state described above.

Although the difference described above is caused mainly by the driving to zoom (i.e., the movement of the zooming lens group and the change in the zooming position), since a change in the field angle is caused at the time of focus adjustment (i.e., the movement of the focus lens unit), the focus adjustment may also be a cause of the difference. Therefore, the driving speed of the imaging optical system in the panning direction and in the tilting direction may be adjusted in consideration of the focusing position.

In the present invention, if the amount of driving to rotate during the preset mode is greater than the above-described threshold value, the driving to rotate the imaging optical system is performed by a normal driving operation (e.g., in a normal driving state). Here, the normal driving operation (e.g., the normal driving state, the normal state) are a state in which panning and tilting of the imaging optical system is driven at a constant speed (e.g., the maximum speed) except for the initial accelerating time and the last decelerating time. In particular, it is desirable that an error of the acceleration at the accelerating time and the acceleration in the decelerating time is within 20% (preferably 10%) without a plus or minus sign. In other words, the normal state is a state in which a change in the driving speed is determined not by the change rate per unit time of the imaging field angle by the zooming of the imaging optical system and the imaging field angle but by the driving amount (i.e., the amount of driving to rotate) and the driving time.

The amount of driving to rotate, the imaging field angle and the imaging range and so forth which are described above are defined independently in the panning direction and in the tilting direction. For example, the amount of driving to rotate may be greater than the threshold value regarding the panning direction and may be lower than the threshold value regarding the tilting direction. In this case, the driving to pan is performed at a driving speed in accordance with the change rate of the imaging field angle by the zooming regarding the panning direction as described above, and the normal driving to tilt (i.e., driving at a constant speed) is performed regarding the tilting direction. That is, after comparing the amount of driving to rotate during the preset operation and the threshold value in each of the panning direction and the tilting direction, the rotational speed is independently controlled in each direction.

During the preset mode, the speed of driving to rotate in a case in which the imaging optical system is situated further toward the wide angle side than a predetermined zooming position and the speed of driving to rotate in a case in which the imaging optical system is situated further toward the telephoto side than a predetermined zooming position are made to be different from each other. In particular, if the change rate per unit time of the imaging field angle (i.e., per unit movement of the zooming lens group) is greater in the vicinity of the wide angle end than in the vicinity of the telephoto end, the rotational speed in the vicinity of the wide angle end is made higher than that in the vicinity of the telephoto end. The opposite is true.

Hereinafter, with reference to the block diagram of FIG. 1, a configuration of a first embodiment of the present invention will be described.

First Embodiment

A system of the present embodiment includes an operation unit 10 and a camera platform system (i.e., a camera system) 20. An operator may acquire a desired image by operating the operation unit 10, operating the camera platform system 20 by remote control and adjusting zooming, focusing, tilting, panning and various functions of the camera.

The camera platform system (i.e., the camera system) 20 includes a camera platform 21, a lens (i.e., the imaging optical system) 22 and a camera (i.e., a camera body which includes image pickup elements) 23. The camera platform (i.e., a drive unit, a camera drive unit) 21 includes a CPU 211, an operation instruction communication unit 212, a pan control unit 213a, a tilt control unit 213b, a pan motor 214a, a tilt motor 214b, a lens control unit 215, a camera control unit 216 and memory 217. The CPU receives an operation instruction from the operation unit via the operation instruction communication unit. If the received instruction is a pan-tilt control instruction, the pan motor and the tilt motor are made to operate via the pan control unit and the tilt control unit. If the received instruction is a zoom-focus control instruction, the lens is controlled via the lens control unit and the zooming and focusing are controlled. If the received instruction is a camera control instruction, various functions of the camera are controlled via the camera control unit. If the received instruction is a preset position storage instruction, current positions regarding zooming, focusing, tilting and panning are stored in the memory and the stored positions are managed as a table corresponding to predetermined numbers from the operation unit. If the received instruction is a preset execution instruction, the CPU reads a preset position of the number designated by the operator from the memory and causes each control unit to operate for designated seconds so that the camera is moved to a stored position.

Figure 2:
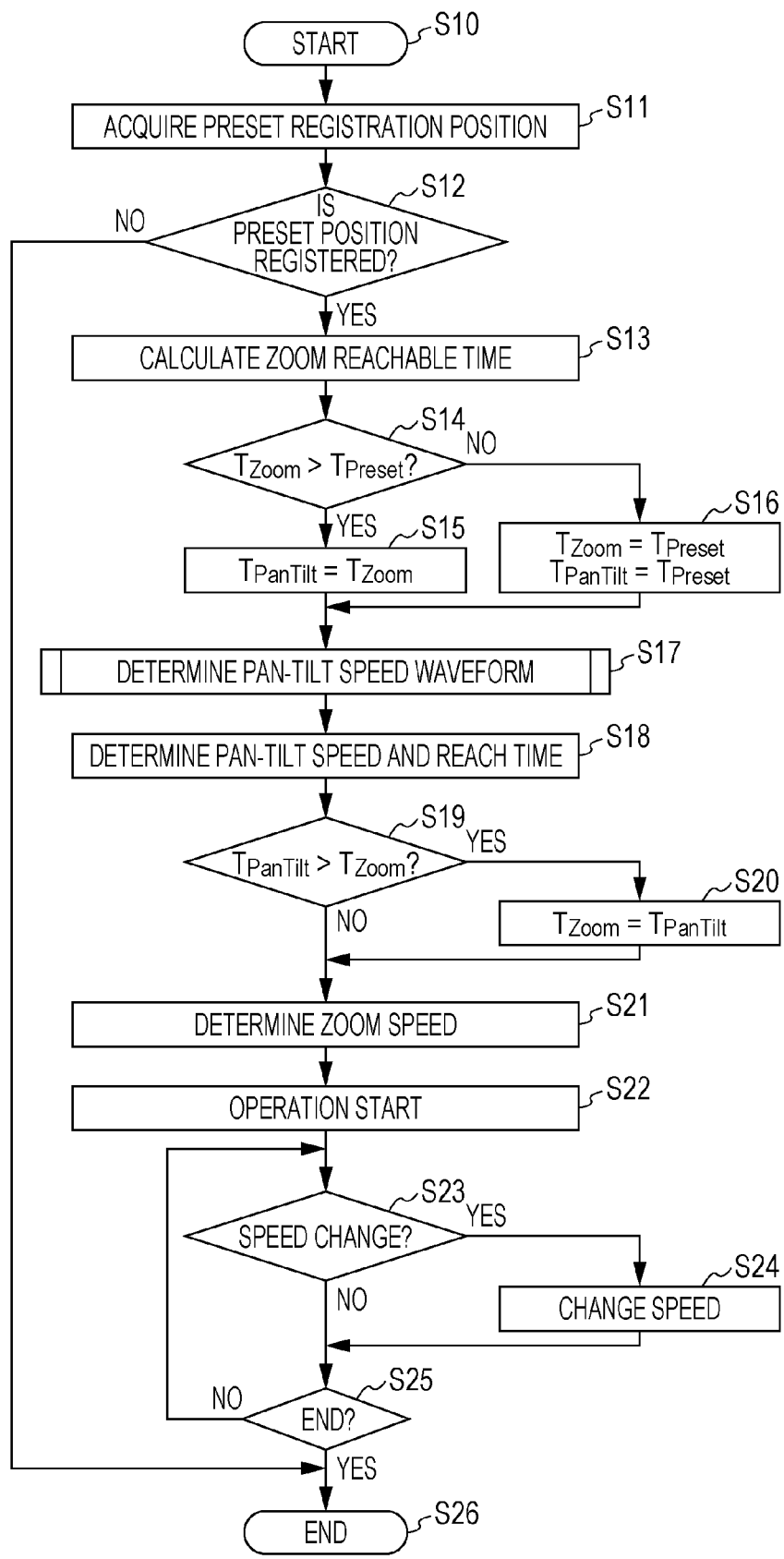
FIG. 2 is a flowchart illustrating a process of a CPU when a preset operation instruction is received in the first embodiment.

Next, a process of the CPU when the preset operation instruction is received will be described with reference to a flowchart of FIG. 2. The CPU acquires a registered position of the designated preset number from the memory (step S11). The CPU checks whether the preset position has been registered in the designated number (step S12). If the preset position has not been registered, the subsequent processes are not performed and the preset operation is ended. If the preset location has been registered, the time in which the camera may reach the zoom preset register position $P_{Zpreset}$ from the current position $P_{Zcurrent}$ when being operated at the maximum speed $V_{Zmax}$ is calculated and set to $T_{Zoom}$ (step S13). If $V_{Zmax}$ is constant irrespective of the zooming position and if influences of, for example, the speed at the accelerating time and the speed at the decelerating time are ignored, $T_{Zoom}$ is calculated by the following equation: $T_{Zoom}=|P_{Zpreset}-P_{Zcurrent}|/V_{Zmax}$. On the other hand, if a camera lens of which maximum speed varies, i.e., especially the speed of which is reduced at the telephoto side, is used, a zooming position at which the speed varies and the speed thereat are stored previously in a table in the memory. $T_{Zoom}$ is calculated on the basis of the table. Preset execution time $T_{Preset}$ designated by the operation unit is compared with $T_{Zoom}$ (step S14). If $T_{Zoom}$ is longer than $T_{Preset}$, $T_{Zoom}$ is set to the moving time for panning and tilting $T_{PanTilt}$ (step S15). If $T_{Zoom}$ is shorter than $T_{Preset}$, $T_{Preset}$ is set to $T_{Zoom}$ and $T_{PanTilt}$ (step S16). Next, a speed waveform representing the speed in the elapsed time from the start of the preset operation of the panning and tilting operations is determined on the basis of the current position and the target position of the zooming (step S17). Then, an absolute value of the speed of a pan-tilt speed waveform is determined in accordance with $T_{PanTilt}$ (step S18). The speed is determined by calculating from the side at which the moved amount is larger and the speed is faster. If the maximum value of the calculated speed exceeds the previously determined maximum speed of the possible panning and tilting operations, $T_{PanTilt}$ is calculated and reset so that the possible panning and tilting operations do not exceed the possible maximum speed. Then, the other of which moved amount is smaller is calculated and the speed is determined. When $T_{PanTilt}$ is reset and becomes longer than $T_{Zoom}$ (step S19), the time of $T_{PanTilt}$ is substituted into $T_{Zoom}$ so that time of $T_{Zoom}$ is equal to the time of $T_{Pantilt}$ (step S20). Further, the speed of the zoom is determined to operate in $T_{Zoom}$ (step S21). With the above-described processes, it is possible to determine the operation speed in which zooming, tilting and panning operations are ended at the same time, with respect to elapsed time. Then, each control unit is operated so that operation of zooming, tilting and panning operations are performed at the pre-determined speed and the preset operation is started (step S22). After the preset operation is started, the CPU determines whether it is the timing at which the speed is to be changed so that the preset operation is performed with a speed curve with respect to the elapsed time determined before the start (step S23) and, if necessary, the CPU changes the speed (step S24). This operation is repeated until $T_{Zoom}$ and $T_{PanTilt}$ elapsed and, if all the operations have stopped, it is determined that the processes are ended (step S25). With the above-described processes, it is possible to achieve the preset operation in which the zooming, tilting and panning are started/stopped at substantially the same time. The preset operation is operated in the execution time which is designated by the operation unit when the speed of the preset operation does not exceed the maximum speed of the possible zooming, tilting and panning operations. On the other hand, in a case in which either one of zooming, panning or tilting operation exceeds the possible maximum speed if the preset operation is performed in the designated time, the preset operation is operated in the shortest time in which zooming, tilting and panning operations are started/stopped at the same time and the speed does not exceed the maximum speed.

Figure 3:
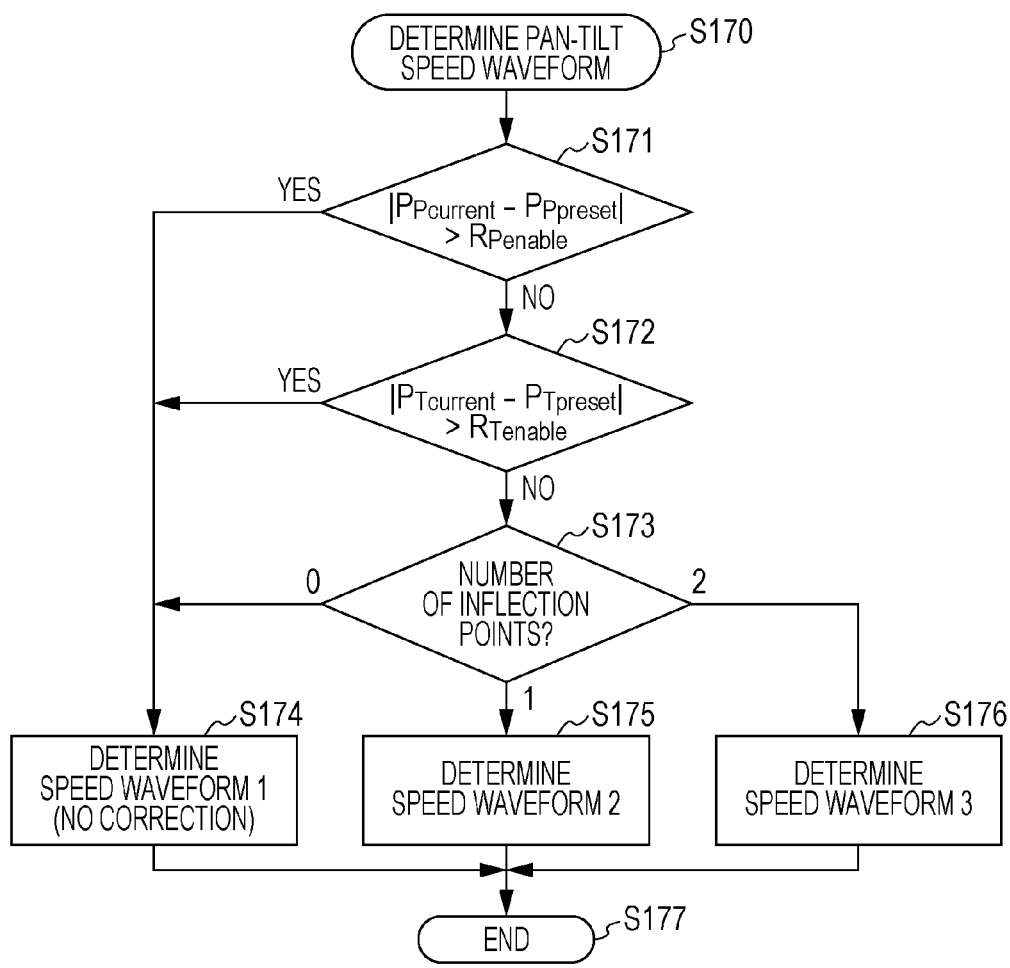
FIG. 3 is a flowchart illustrating a process of a CPU for determining a pan-tilt operation speed waveform in the first embodiment.

Next, a process of the CPU at the time of determining a speed waveform of panning and tilting operations of step S17 will be described with reference to a flowchart of FIG. 3. First, the moved amount of the panning operation by the maximum imaging field angle of the camera is registered in the memory as the preset possible range $R_{Penable}$, and the moved amount of the tilting operation by the maximum imaging field angle of camera is registered in the memory as the preset possible range $R_{Tenable}$. The CPU first determines whether the moved amount of the panning operation which is a difference between the current panning position $P_{Pcurrent}$ and a target panning position $P_{Ppreset}$ is within a range of $R_{Penable}$ (step S171). If the moved amount is out of the range, correction is not performed and the process proceeds to step S174 where a speed waveform 1 is employed. If the moved amount is within the range, the same determination is made about tilting (step S172).

Figure 4:
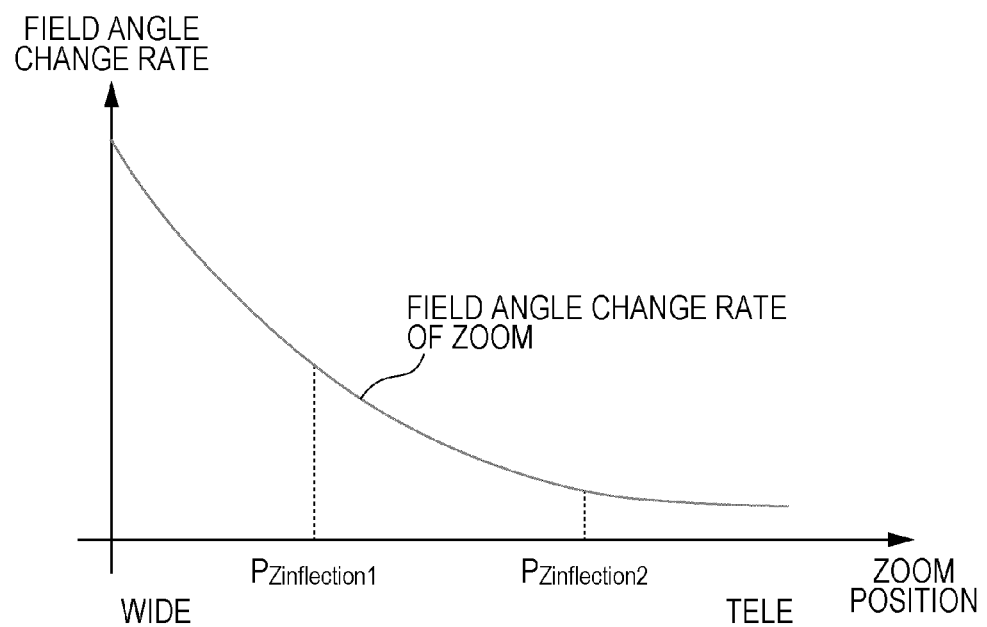
FIG. 4 is an exemplary change rate of a field angle with respect to a zooming position in the first embodiment.
Figure 5:
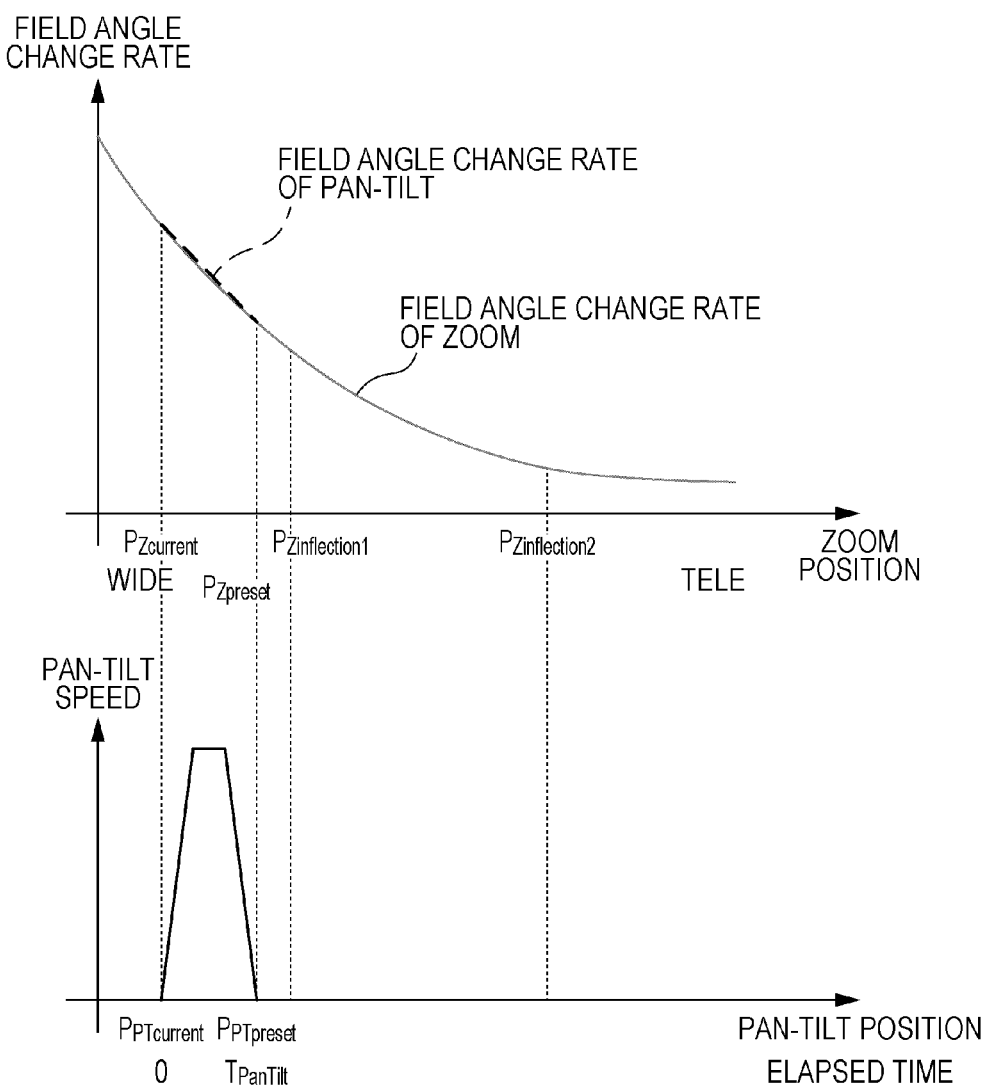
FIG. 5 is an exemplary pan-tilt operation speed waveform when an inflection point is 0 in the first embodiment.
Figure 6:
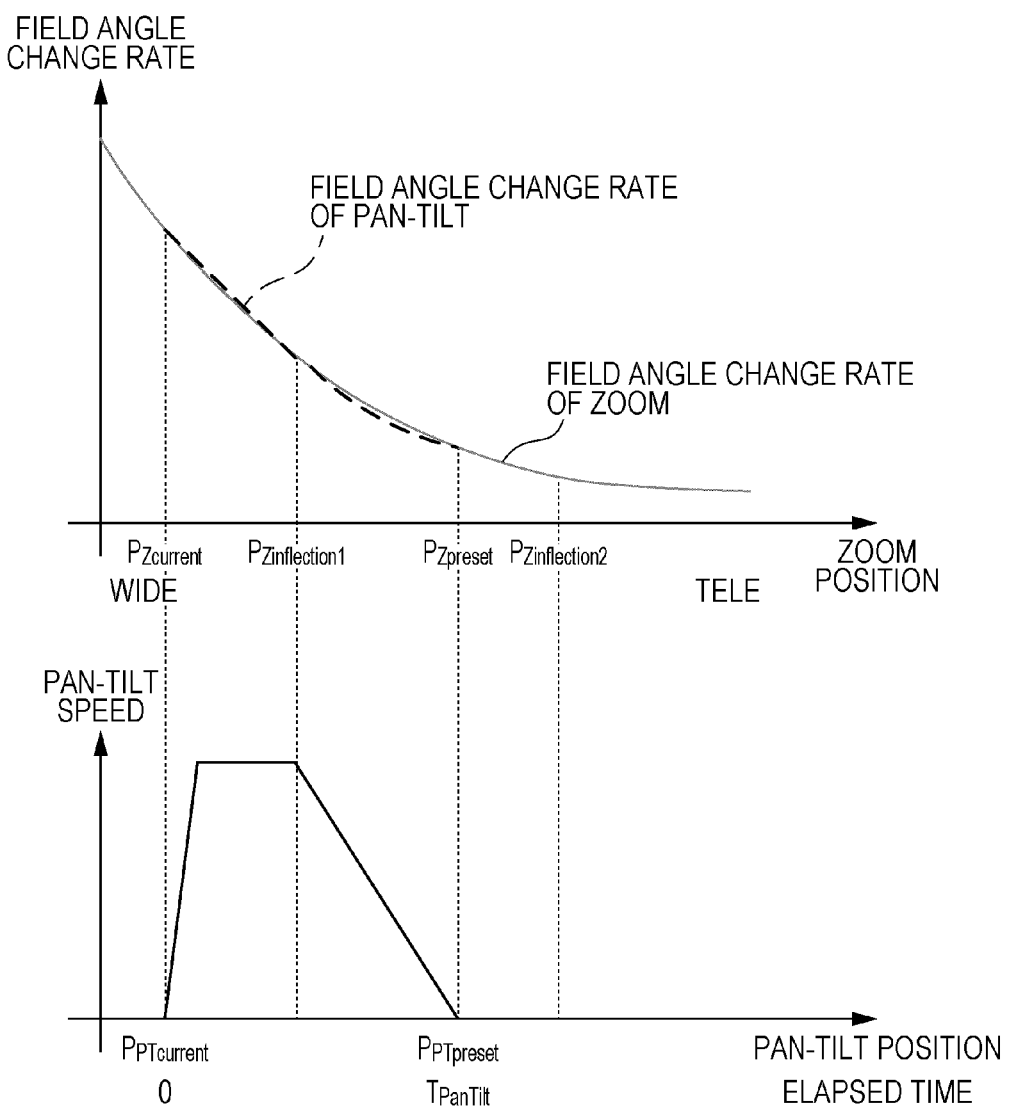
FIG. 6 is an exemplary pan-tilt operation speed waveform when an inflection point is 1 in the first embodiment.
Figure 7:
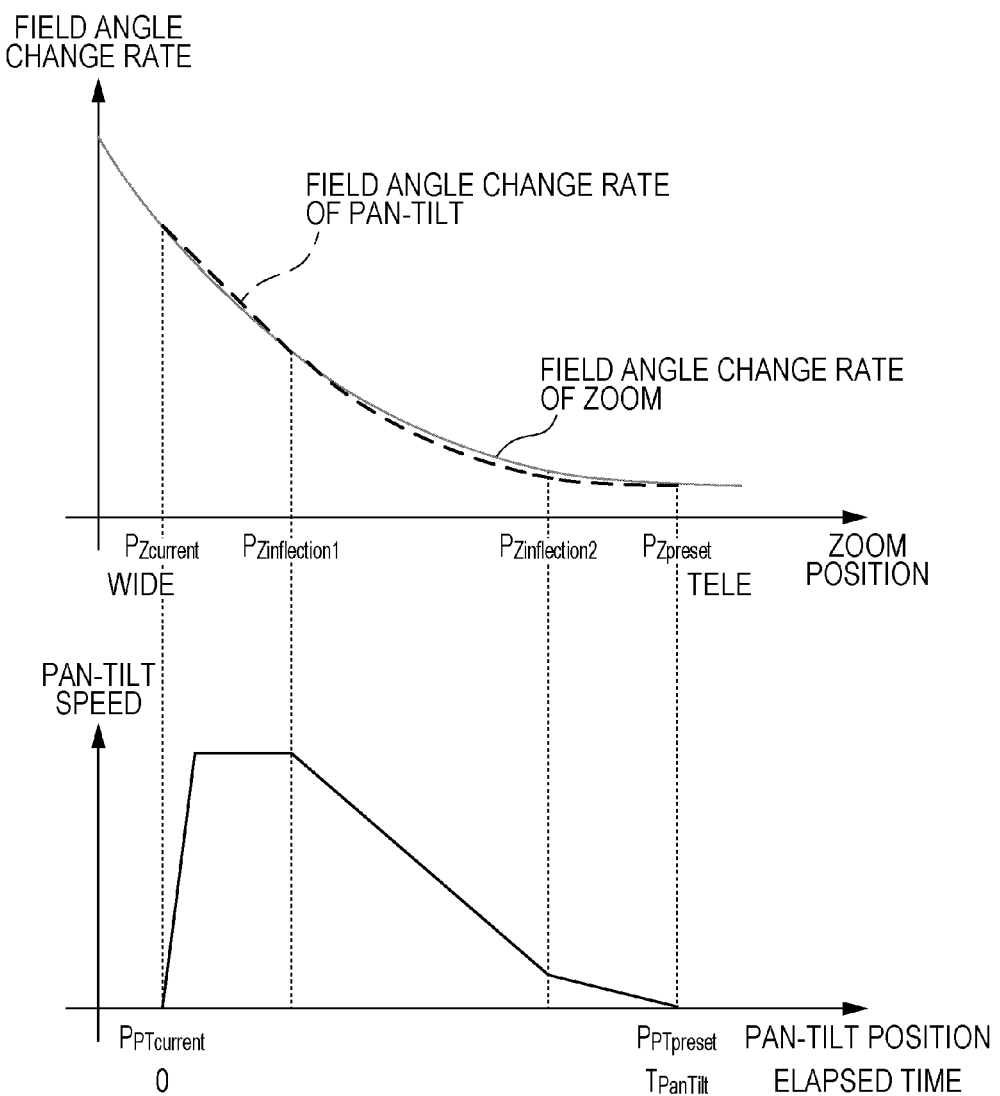
FIG. 7 is an exemplary pan-tilt operation speed waveform when an inflection point is 2 in the first embodiment.

Hereinafter, a method for determining the speed waveform will be described. Generally, the change rate of the imaging field angle in a case in which the zooming operation is performed at a constant speed becomes smaller toward the telephoto side from the wide angle side as illustrated in FIG. 4. The camera platform previously registers, in the memory, the zooming positions $P_{Zinflection1}$ and $P_{Zinflection2}$ which are the points of inflection at which the change rate of the field angle in the zooming operation changes significantly. First, CPU determines how many inflection points are to be set during the preset operation on the basis of $P_{Zcurrent}$ and $P_{Zpreset}$ (step S173). If $P_{ZinflectionN}$ (N=1 or 2) exists between $P_{Zcurrent}$ and $P_{Zpreset}$ and not within acceleration/deceleration areas for a constant speed at the time of starting and stopping of the operation, that $P_{ZinflectionN}$ is recognized as an inflection point. If the number of the inflection points is 0 and no correction is made, the speed waveform is defined such that the operation in the entire area is at the constant speed except for the acceleration/deceleration areas for a constant speed at the time of starting and stopping of the operation as illustrated in FIG. 5 (step S174). If the number of the inflection points is 1, as illustrated in FIG. 6, except for the acceleration/deceleration areas for a constant speed at the time of starting and stopping of the operation, the speed waveform is defined such that the speed is constant on the side further toward the wide angle side than the inflection point and acceleration is fixed on the side further toward the telephoto side than the inflection point (Step S175). If the number of the inflection points is 2, as illustrated in FIG. 7, except for the acceleration/deceleration areas for a constant speed at the time of starting and stopping of the operation, the speed is defined to be constant on the side further toward the wide angle side than the inflection point on the wide angle side. Acceleration is fixed in an area between the inflection points and an area further toward the inflection point on the side of the telephoto side, and the absolute value of the acceleration on the telephoto side is made smaller (step S176). Using the thus-determined speed waveform, the preset operation after step S18 is performed. In step S18, if $T_{PanTilt}$ is to be reset such that the maximum speed of panning and tilting does not exceed the speed in which panning and tilting can be operated, the speed in the area in which the imaging optical system is operated at a constant speed is reset to be equal to the maximum speed of the possible panning and tilting operations. The time required for the panning and tilting operations to be performed such that a ratio of time to pass through each inflection point becomes equivalent to the speed waveform determined in step S17 is set to $T_{PanTilt}$.

In the foregoing, the case in which $P_{Zpreset}$ is situated further toward the telephoto side than $P_{Zcurrent}$ is described with reference to FIGS. 5 to 7. If $P_{Zpreset}$ is situated on the wide angle side, the current position and elapsed time are in opposite relationship. That is, except for the acceleration/deceleration areas for a constant speed at the time of starting and stopping of the operation, the panning and tilting operations are to be performed such that their operation speed is constant or increases as a target position becomes closer.

By operating the panning and tilting so as to correspond to the change in the imaging field angle by the zooming, it is possible to prevent to reduce the time in which the operations are performed at the maximum speed and to increase the time in which the preset operation can be operated. Regarding the movement of the subject in the imaging field angle, since the panning and tilting operations are performed to correspond to the zooming operation, the process may be performed automatically such that correction is made in a case in which an effect is large and that priority is given to the preset execution time in a case in which an effect is small, e.g., the subject disappears from the field angle. By performing approximation using the inflection points, the process which causes the change rate of the field angle of the zooming and the change rate of the field angle of the panning and tilting to be substantially the same may be performed in an easier process. Since a plurality of inflection points may be set, the present embodiment may be applied even if the curve of the change rate of the field angle with respect to the zooming position is more complicated. Further, since the process is performed on the side of the camera platform, it is possible to implement the present embodiment without being affected by a delay amount between the operation unit and the camera platform.

As a system derived from the present embodiment, a part or the entire of the operation instruction communication unit, the pan control unit, the tilt control unit, the lens control unit and the camera control unit may be controlled by the CPU. Memory for dedicated use may be provided or memory built in the CPU may be used. In the foregoing description, although the preset operation only include zooming, tilting and panning, various functions of the camera, such as focusing and iris, may be added. In the foregoing description, although $R_{Penable}$ and $R_{Tenable}$ are the maximum imaging field angles, other values may be used. In the foregoing description, although the moved amount is greater than $R_{Penable}$ and $R_{Tenable}$, the imaging optical system may be operated at a constant speed in a case in which the moved amount is so small that the effect of correspondence of the change rate is small. In the foregoing description, although panning or tilting operation is performed at a constant speed when either the panning operation or the tilting operation is out of the preset possible range, both of the panning or tilting operations may be performed at a constant speed when both of the panning and tilting are out of range. In the foregoing description, although the number of curves representing the change rate of the field angle of zooming is one, in an imaging optical system in which the lens is exchangeable, a process to identify the model of the lens may be added and the position of inflection points to be used may be changed in accordance with the model of the lens. In the foregoing description, although the number of inflection points is two, the number may be increased or reduced in accordance with the curve representing the change rate of the field angle of the zooming.

Second Embodiment

Figure 8:
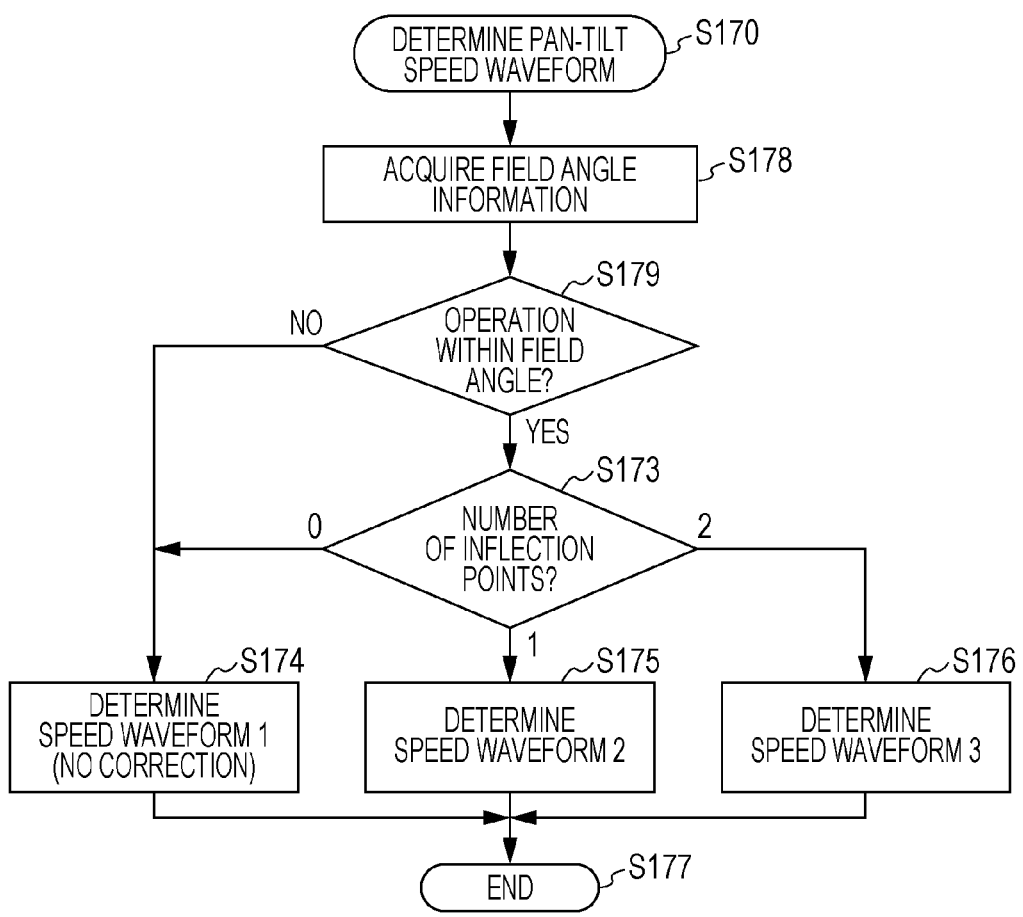
FIG. 8 is a flowchart illustrating a process of a CPU for determining a pan-tilt operation speed waveform in a second embodiment.

Hereinafter, a second embodiment of the present invention will be described. A configuration of the second embodiment is the same as that of the first embodiment which is illustrated in FIG. 1. A process of a CPU for determining operation speed waveforms for panning and tilting will be described with reference to a flowchart of FIG. 8. FIG. 8 is similar to the process of the first embodiment illustrated in FIG. 3 but steps S171 and S172 are deleted and step S178 and S179 are added.

First, the change rate of the field angle or the range of the field angle in accordance with a certain zooming position as illustrated in FIG. 4 is registered previously as a table in the memory. The CPU reads the field angle information at a position of the wide angle side from the memory between a current position $P_{Zcurrent}$ and the target position $P_{Zpreset}$ of the zoom (step S178). Since horizontal and vertical imaging ranges are recognized on the basis of this field angle information, it is determined whether the moved amounts in the panning and tilting are within the range of the field angle (step S179). If the moved amount is within the range of the field angle, the process proceeds to step S173 and, if the moved amount is out of the range of an operation field angle, the process proceeds to step S174, where the same process as that of the first embodiment will be performed respectively.

A system derives from the present embodiment is the same as that of the first embodiment. In the foregoing description, although the field angle is recognized by storing the field angle information as a table in the memory, any method, such as acquisition by communication with a lens, may be employed as long as the field angle may be recognized. In the foregoing description, although panning or tilting operation is performed at a constant speed when either the panning operation or the tilting operation is out of the preset possible range, both of the panning or tilting operations may be performed at a constant speed when both of the panning and tilting are out of range.

Although the preferred embodiments of the present invention have been described, the present invention is not limited to the same. Various modifications and changes may be made without departing from the scope of the present invention.

For example, the present invention is applicable to a camera system which is equipped with an image pickup device which includes the imaging optical system described above and the drive unit described above which drives the imaging optical system.

According to the present embodiment, a drive unit or a camera system which provides reduced feeling of strangeness to a movement of a subject during the preset operation and which is capable of preventing increasing preset execution time can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-039021 filed Feb. 24, 2012, which is hereby incorporated by reference herein in its entirety.

What is claimed is:

1. A drive unit which is capable of operating in a preset mode in which a zooming operation of an imaging optical system to a predetermined zoom position is performed and, at the same time, driving a rotation of the imaging optical system wherein said rotation includes at least one of panning and tilting of the imaging optical system to a predetermined rotational position, the drive unit comprising a control unit configured to perform the driving of the imaging optical system in the preset mode in accordance with designated predetermined rotational and zoom positions and with rotational and zoom positions of the imaging optical system at the start of the preset mode, wherein the control unit is further configured so that, in a case of operating in the preset mode, if the amount of driving to rotate the imaging optical system is smaller than a threshold value based on the imaging field angle of the imaging optical system, the control unit controls the driving to rotate the imaging optical system at a speed based on the change rate per unit time of the imaging field angle of the zoom of the imaging optical system and, if the amount of driving to rotate of the imaging optical system is greater than the threshold value, the control unit controls the driving to rotate the imaging optical system at a speed not based on the change rate per unit time of imaging field angle of the imaging optical system.

2. The drive unit according to claim 1, wherein the control unit is further configured to set the threshold value to 0.5 times to 1 times a value of a wide field angle of the zooming position between the field angle at the time of starting of the preset mode and a field angle designated in the preset mode.

3. The drive unit according to claim 1, wherein the control unit is further configured to set the threshold value to 0.5 times to 1 times a value of the field angle at the time of starting of the preset mode.

4. A camera system comprising:
an image pickup device which includes an imaging optical system; and
the drive unit according to claim 1 for driving the imaging optical system.

5. A drive unit configured to perform driving to rotate which includes at least one of panning and tilting of an imaging optical system which performs zooming, the drive unit comprising a control unit which is configured to transmit, to the imaging optical system, a zoom instruction in accordance with a zooming position stored in a memory which stores position information including a rotational position in driving to rotate at least one of panning and tilting and a zooming position and drives to rotate the imaging optical system in accordance with the rotational position stored in the memory, wherein:

the control unit is configured so that it may drive the imaging optical system in a preset mode in which transmission of the zoom instruction and the driving to rotate are performed such that zooming of the imaging optical system in accordance with the zoom instruction and the driving to rotate the imaging optical system in accordance with the rotational position are performed at the same time; and in a case in which the preset mode is set, if an amount of driving to rotate the imaging optical system during the preset mode is smaller than a threshold value in accordance with an imaging field angle of the imaging optical system, the control unit is further configured to control the driving to rotate at a speed in accordance with a change rate per unit time of imaging field angle and the imaging field angle by the zooming of the imaging optical system and, if the amount of driving to rotate the imaging optical system during the preset mode is greater than the threshold value, the control unit is further configured to control the driving to rotate at a speed irrespective of a change rate per unit time of the imaging field angle and the imaging field angle by the zooming of the imaging optical system.

6. The drive unit according to claim 5, wherein the control unit is further configured to make the speed of driving to rotate in a case in which the preset mode is set and the imaging optical system is situated further toward the wide angle side than a predetermined zooming position different from the speed of driving to rotate in a case in which the preset mode is set and the imaging optical system is situated further toward the telephoto side than a predetermined zooming position.

7. The drive unit according to claim 5, wherein, if the preset mode is set, the control unit is further configured to control the speed of driving to rotate a camera such that, a change rate per unit time of an imaging range of the imaging optical system by the driving to rotate in a first state in which the change rate per unit time of the imaging field angle is low is smaller than a change rate per unit time of an imaging range of the imaging optical system by the driving to rotate in a second state in which the change rate per unit time of the imaging field angle is larger than in the first state.

8. The drive unit according to claim 7, wherein:
both the first state and the second state exist in a single preset operation; and
in the single preset operation, the control unit is further configured to drive the imaging optical system to rotate such that the speed of the driving to rotate differs in the first state and in the second state.

9. The drive unit according to claim 5, further comprising a receiving unit configured to receive, from the imaging optical system, information about a zooming position of the imaging optical system.

10. A camera system comprising:
an image pickup device which includes an imaging optical system; and
the drive unit according to claim 5 for driving the imaging optical system.

11. A non-transitory machine readable medium carrying device executable instructions which upon execution cause a device to act as a drive unit capable of operating in a preset mode in which a zooming operation of an imaging optical system to a predetermined zoom position is performed and, at the same time, driving a rotation of the imaging optical system wherein said rotation includes at least one of panning and tilting of the imaging optical system to a predetermined rotational position, the drive unit comprising a control unit configured to perform the driving of the imaging optical system in the preset mode in accordance with designated predetermined rotational and zoom positions and with rotational and zoom positions of the imaging optical system at the start of the preset mode, wherein the control unit is further configured so that, in a case of operating in the preset mode, if the amount of driving to rotate the imaging optical system is smaller than a threshold value based on the imaging field angle of the imaging optical system, the control unit controls the driving to rotate the imaging optical system at a speed based on the change rate per unit time of the imaging field angle of the zoom of the imaging optical system and, if the amount of driving to rotate of the imaging optical system is greater than the threshold value, the control unit controls the driving to rotate the imaging optical system at a speed not based on the change rate per unit time of imaging field angle of the imaging optical system.

* * * * *